UNITED STATES PATENT OFFICE.

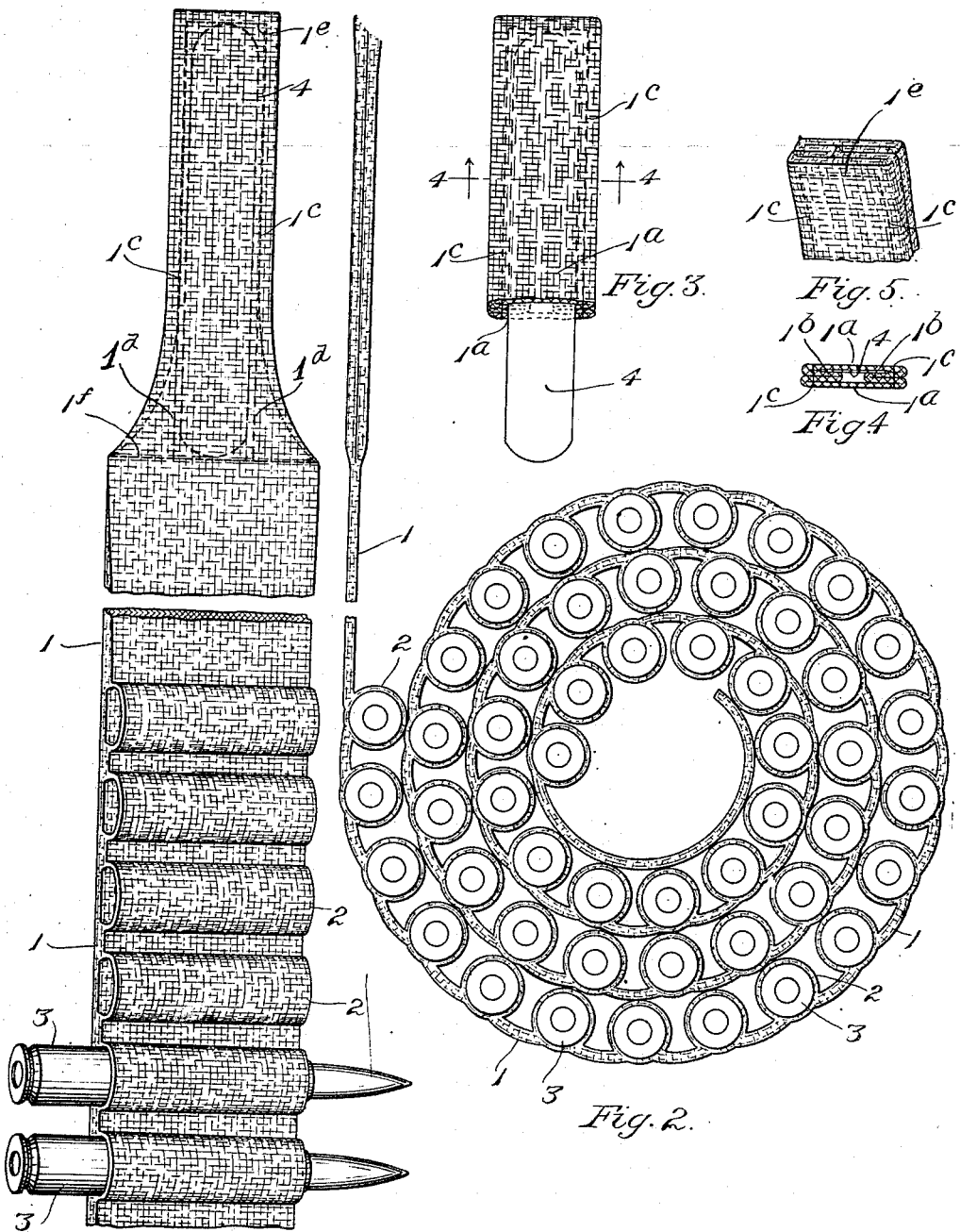

FRANK R. BATCHELDER, OF WORCESTER, MASSACHUSETTS, ASSIGNOR TO UNIVERSAL PATENTS COMPANY, A CORPORATION OF RHODE ISLAND.

MACHINE-GUN BELT.

1,243,686.  Specification of Letters Patent.  Patented Oct. 23, 1917.

Application filed December 26, 1916. Serial No. 138,721.

*To all whom it may concern:*

Be it known that I, FRANK R. BATCHELDER, a citizen of the United States, residing at Worcester, in the county of Worcester, State of Massachusetts, have invented a certain new and useful Improvement in Machine-Gun Belts, of which the following is a specification, reference being had therein to the accompanying drawings.

Heretofore, in practice, machine-gun belts or cartridge-conveyers having the body-portions and pockets or loops thereof made of woven material have been provided with metal (usually brass) end-pieces termed handles, which are utilized to facilitate the insertion of the leading end of a belt into a gun. The use of metal attachments or fittings is undesirable for several reasons, including the matter of cost, the cost being considerable in the case of brass.

The general objects of my invention are, first, to provide a woven machine-gun belt with a better handle than those heretofore known, and secondly to render the use of metal handles unnecessary.

Broadly stated, my invention comprises a machine-gun belt or conveyer having the body thereof of woven material and provided with an end-extension constituting a non-metallic handle or leader; that is to say, presenting no exposed metal. More specifically, the invention comprises a machine-gun belt or conveyer provided with a handle or leader formed of an end-extension of the body-portion of the belt, the said handle or leader comprising a plurality of woven layers, strips, or plies, which are continuous with the said body-portion, with their marginal portions inwardly-tucked or infolded and secured between the outer surfaces, forming a handle or leader of relatively reduced width.

An illustrative embodiment of the invention is represented in the drawings, in which latter,—

Figure 1 is a face view of portions of a machine-gun belt containing such embodiment.

Fig. 2 is a side view of portions of a belt like that of Fig. 1.

Fig. 3 is a face view of a part of the handle of Figs. 1 and 2.

Fig. 4 is a view in section on line 4, 4, of Fig. 3.

Fig. 5 is a view on the order of a perspective showing the outer or free end of the said handle.

Having reference to the drawings,—

The belt or conveyer shown therein comprises a continuous body-web 1, on which are woven pockets or loops 2, 2, etc., to contain the cartridges 3, 3, etc. The special characteristics and mode of production of the said body-web and pockets or loops are not material to the invention, and may vary in practice. In this instance, the body-web is woven solid between the pockets or loops, and beyond the end pocket or loop of the series, but for at least the length of the handle it is woven in upper and under plies or layers, as $1^a$, $1^a$, Figs. 3 and 4. These plies or layers are separate, except at the web-margins, where they are connected in the weaving so that this portion of the web resembles a flattened tube.

To make the handle, the marginal portions $1^b$, $1^b$, of the two plies or layers $1^a$, $1^a$, are inwardly tucked or infolded between the said plies or layers, as shown in Figs. 3 and 4, to an extent sufficient to reduce the handle to the required width, and the four thicknesses produced thereby are secured together by lines of stitches $1^c$, $1^c$, extending lengthwise of the handle. Thereby the handle is thickened somewhat, as indicated in Fig. 2, and given a certain increased rigidity. A stiffener-strip 4 is shown in Figs. 1, 3 and 4, inserted between the plies or layers $1^a$, $1^a$, to give greater rigidity than is secured by the infolding or inward tucking. The said stiffener-strip is shown confined laterally by the lines of stitches $1^c$, $1^c$, and by short lines $1^d$, $1^d$, at its inner end. The free extremity of the handle is finished off by tucking inward the corresponding ends of the two plies or layers and their infolds, as indicated in Fig. 5, and securing the whole by a transverse line of stitches $1^e$. The stiffener may be composed of some non-metallic material, or it may be constituted of what is known as walohn, namely steel protected by a coating of rubber. At $1^f$ is a line of stitches run across the inner end of the handle.

The invention is not limited in application to belts or conveyers of the particular character of that shown in the drawings, but is applicable to other forms of belts or conveyers having the pockets or loops woven upon or in the body-web, as well as to belts composed of woven strips secured together by means of binders or otherwise. In some cases the stiffener 4 may be omitted.

What is claimed as the invention is,—

1. A machine-gun belt provided with an end-extension comprising a plurality of woven layers, strips, or plies, which are continuous with the body-portion of the belt, with their marginal portions inwardly-tucked or infolded and secured between the outer surfaces, forming a handle or leader of relatively-reduced width.

2. A machine-gun belt having the body thereof of woven material and provided with a stiffened end-extension constituting a handle or leader and presenting no exposed metal.

3. A machine-gun belt provided with an end-extension comprising a plurality of woven layers, strips, or plies having their marginal portions inwardly-tucked or infolded and secured between the outer surfaces, and stiffening means also between such surfaces.

4. A machine-gun belt having the body thereof of woven material and provided with a flattened tubular end-extension, with portions of such end-extension inwardly-tucked or infolded and secured between the outer surfaces, forming a handle or leader of relatively-reduced width.

5. A machine-gun belt having the body thereof of woven material and provided with a flattened tubular end-extension, with portions of such end-extension inwardly-tucked or infolded and secured between the outer surfaces, with a stiffener also contained between such surfaces, forming a handle or leader of relatively-reduced width.

In testimony whereof I affix my signature in presence of two witnesses.

FRANK R. BATCHELL

Witnesses:
RAYMOND V. SEITZ,
FRANCES A. MILLER.